US010122588B2

(12) United States Patent
Murray et al.

(10) Patent No.: US 10,122,588 B2
(45) Date of Patent: Nov. 6, 2018

(54) RING NETWORK UPLINK DESIGNATION

(71) Applicant: HEWLETT PACKARD ENTERPRISE DEVELOPMENT LP, Houston, TX (US)

(72) Inventors: Christopher Murray, Houston, TX (US); Jonathan R. Guthrie, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 15/507,333

(22) PCT Filed: Mar. 26, 2015

(86) PCT No.: PCT/US2015/022655
§ 371 (c)(1),
(2) Date: Feb. 28, 2017

(87) PCT Pub. No.: WO2016/153511
PCT Pub. Date: Sep. 29, 2016

(65) Prior Publication Data
US 2017/0288975 A1 Oct. 5, 2017

(51) Int. Cl.
H04L 12/24 (2006.01)
H04L 12/46 (2006.01)
H04L 12/423 (2006.01)

(52) U.S. Cl.
CPC ............ H04L 41/12 (2013.01); H04L 12/423 (2013.01); H04L 12/4641 (2013.01)

(58) Field of Classification Search
CPC .... H04L 41/12; H04L 12/423; H04L 12/4641
See application file for complete search history.

(56) References Cited

U.S. PATENT DOCUMENTS 6,578,086 B1  6/2003 Regan et al.
7,391,771 B2  6/2008 Orava et al.
(Continued)

OTHER PUBLICATIONS

"Enabling or Disabling LACP on a Uplink Port Group Using the Vsphere Web Client," Dec. 11, 2014, pp. 1-3, Knowledge Base, VMware.
(Continued)

Primary Examiner — Habte Mered
(74) Attorney, Agent, or Firm — Hewlett Packard Enterprise Patent Department

(57) ABSTRACT

Examples associated with ring network uplink designation are disclosed. One example includes detecting an operable connection between a member of a ring network and an external network. The operable connection may be detected by the member of the ring network. A signal is provided to a ring network management daemon. The signal may indicate the member of the ring network has the operable connection to the external network. A signal is received from the ring network management daemon. The signal may designate the ring network as an active uplink to the external network. The operable connection between the ring network and the external network is activated. Once activated, the operable connection may facilitate communication between members of the ring network and the external network.

15 Claims, 6 Drawing Sheets

(56) References Cited

U.S. PATENT DOCUMENTS

| | | | |
|---|---|---|---|
| 8,705,347 B2* | 4/2014 | Kwon | H04L 12/423 370/222 |
| 8,792,337 B2 | 7/2014 | Higgins | |
| 2003/0158936 A1* | 8/2003 | Knop | H04L 29/06 709/224 |
| 2003/0212830 A1 | 11/2003 | Greenblat et al. | |
| 2011/0249551 A1* | 10/2011 | Rollins | H04L 12/437 370/222 |
| 2012/0321309 A1 | 12/2012 | Barry et al. | |
| 2013/0315580 A1 | 11/2013 | Boertjes et al. | |
| 2013/0336320 A1 | 12/2013 | Rangarman | |
| 2014/0078886 A1* | 3/2014 | Shukla | H04L 12/437 370/218 |
| 2014/0153924 A1 | 6/2014 | deRuijter | |
| 2015/0016278 A1* | 1/2015 | Hayes | H04L 43/0864 370/249 |
| 2015/0049641 A1* | 2/2015 | Pugaczewski | H04L 45/02 370/254 |
| 2015/0381408 A1* | 12/2015 | Kompella | H04L 41/0668 370/222 |

OTHER PUBLICATIONS

International Search Report and Written Opinion, International Application No. PCT/US2015/022655, dated Mar. 2, 2016, pp. 1-11, KIPO.

* cited by examiner

RING NETWORK UPLINK DESIGNATION

BACKGROUND

In a datacenter, enclosures are often linked to enhance connectivity and create redundancy. Ring topologies provide a redundant path between enclosures. In a ring topology, each enclosure has a left link and a right link to facilitate communication around the ring. If a link goes down, a path between enclosures in the opposite direction around the ring may remain while an administrator repairs the broken link. Each enclosure may include a network module (e.g., Ethernet switch, virtual connect fabric) to facilitate communication between enclosures, network devices performing services within the enclosures (e.g., servers, databases), and external networks to whom the services are provided.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems, methods, and equivalents associated with ring network uplink designation are described. As members of a ring network initialize and come online, several actions are taken to ensure proper functioning of the ring network. One concern with a ring network is formation of a loop, which may cause broadcast messages transmitted via the ring to be continuously sent around the ring, eventually overloading the ring and bringing down the network. To prevent this, a ring owner is selected to break loops in the ring network by dropping packets that might otherwise pass through the ring owner. In some examples, an administrator may select a ring owner, though some ring networks may be configured to automatically select a ring owner (e.g., based on lowest media access control (MAC) address).

Loops may also form when a ring network has multiple connections to external networks (e.g., customer networks, the Internet). For example, if a message broadcast into the ring network from one connection to the external network is broadcast back to the external network via a second connection to the external network, a loop may form, again potentially resulting in overloading the ring network with traffic and bringing traffic to a halt. To prevent this, as enclosures within a ring network come online, the enclosures may detect whether they have operable connections to an external network. If such a connection exists, the enclosures may advertise their respective connections to other members of the ring network, while isolating their respective connections until receiving a signal to activate their connection from, for example, the ring owner.

Figure 1:
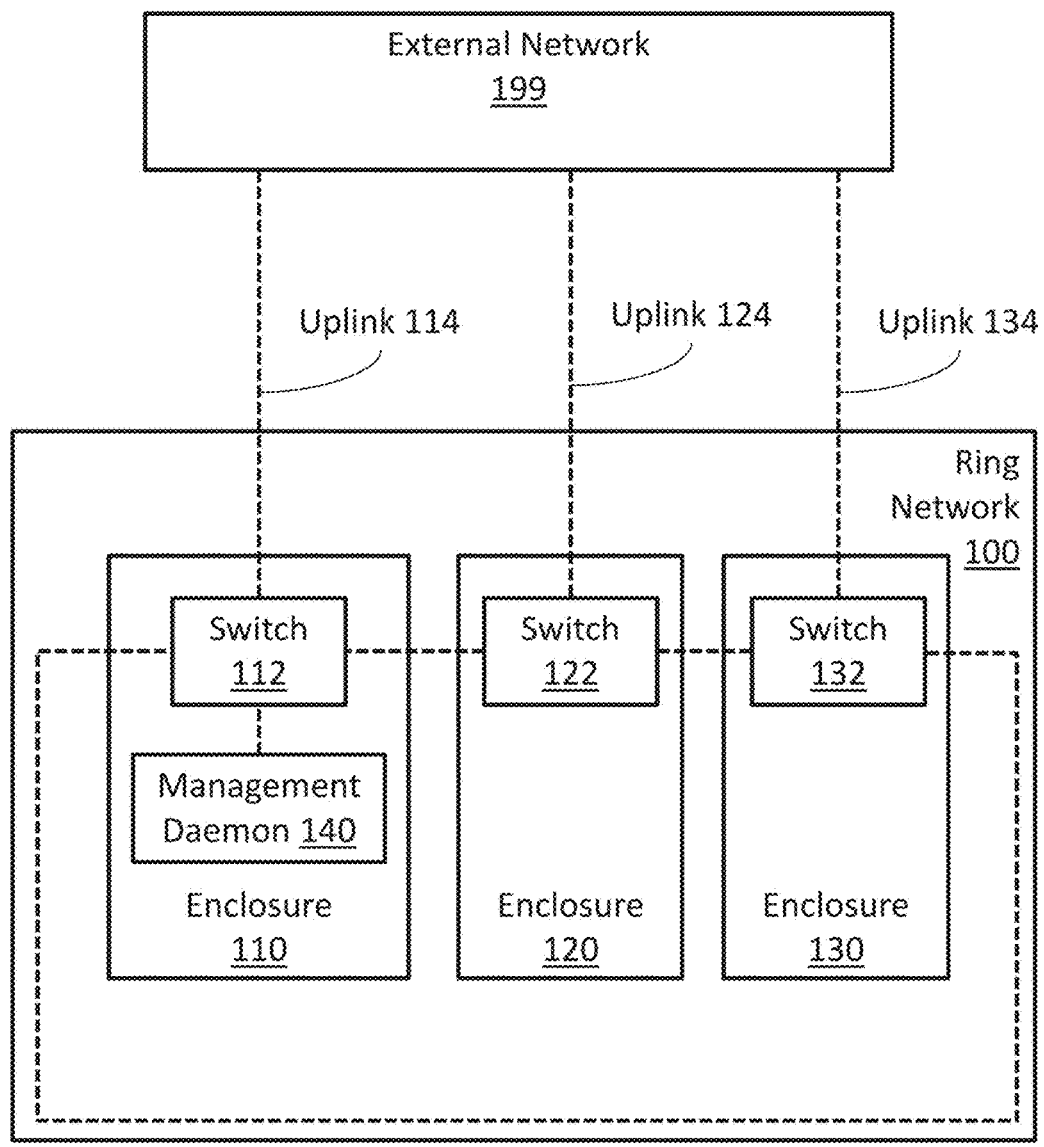
FIG. 1 illustrates an example ring network, on which example systems, and methods, and equivalents, may operate.

FIG. 1 illustrates an example ring network 100 on which example systems and methods, and equivalents, may operate. It should be appreciated that the items depicted in FIG. 1 are illustrative examples and many different features and implementations are possible.

FIG. 1 illustrates an example ring network 100. The ring network includes several enclosures 110, 120, and 130. Enclosures 110, 120, and 130 may be, for example, racks housing devices (not shown) designed to provide services in response to requests received from, for example, computers in an external network 199. In various examples, the devices housed in the enclosures 110, 120, and 130 may include servers, storage devices, processors, and so forth. Consequently, the services may include, for example, website hosting, database services, application services, processing services, storage services, and so forth. The devices in each enclosure 110, 120, and 130 may be connected via a corresponding switch, 112, 122, and 132 in each of enclosures 110, 120, and 130. Switches 112, 122, and 132 may also be connected to external network 199 via uplinks 114, 124, and 134. In various examples, uplinks 114, 124, and 134 may have similar features (e.g., bandwidth, latency) making uplinks 114, 124, and 134 mutually interchangeable for the purposes of communicating between components of ring network 100 and external network 199.

As illustrated, each of enclosures 110, 120, and 130 in ring network 100 are illustrated as having corresponding uplinks 114, 124, and 134 to external network 199. In other examples, it may be the case that not every enclosure has a corresponding uplink to external network 199. Consequently, to facilitate use of resources on enclosures without a corresponding uplink, switches 112, 122, and 132 are linked to facilitate communication between enclosures 110, 120, and 130. Communication between enclosure 110, 120, and 130 may also be desirable, for example when an enclosure's corresponding uplink has become inactive. In some examples, the switches 112, 122, and 132 may be connected using a ring topology. A ring topology is a topology where each device in the topology is connected to two other devices such that a single loop is formed. Each device has a left path and a right path, providing redundant paths around the ring for each device. If one link becomes disconnected, a device may still communicate with other devices within the network via the opposite direction around the ring.

As enclosures 110, 120, and 130 come online, switches 112, 122, and 132 may discover one another and perform various functions associated with initializing the ring network. In some example ring network, much of the traffic will be broadcast around the network using broadcast signals. Consequently, if measures are not taken to prevent traffic from being endlessly broadcast around the ring, the network may quickly become overloaded with traffic and become non-functional. For traffic originating from the ring network that will stay within the ring network, switches 112, 122, and 132 may be designed to drop packets that originate from their corresponding enclosure. For example, switch 122 may drop packets having media access control (MAC) addresses of devices within enclosure 120. Preventing packets from leaving the ring network may be achieved by, for example, assigning the packets to a private virtual local area network (VLAN) that is exclusive to devices within the ring network.

For packets that are to be sent to and received from external network 199, dropping packets associated with certain MAC addresses may be unfeasible because packets received from external network 199 will originate from devices with a MAC address not in the ring, meaning no member of the ring will drop these packets based on MAC addresses. Consequently, to prevent loops, one enclosure may be designated as the "owner" of the ring network. In this example, enclosure 110 has been designated the owner of ring network 100 and is running a management daemon 140 that performs various functions associated with managing ring network 100. In some networks, ownership of ring network 100 may be configured by an administrator. However, if the owner goes down, ring network 100 may fail until a new owner is configured by the administrator. Consequently, other ring networks may be designed to automatically select a network owner, and replace the owner in the event of a failure of the original owner. By way of illustration, ring network ownership may be selected based on which switch 112, 122, or 132 has the lowest MAC address.

In some ring networks, the G.8032 protocol may be used by devices within the ring network and management daemon 140 to prevent ring network loops. By way of illustration, to prevent loops from forming within ring network 100, management daemon 140 may break the ring for non-internal traffic and cause packets not associated with the private VLAN for the ring to be dropped. If another switch, enclosure, or link within ring network 100 goes down, this may be detected based on traffic from the private VLAN, at which point management daemon 140 can at least temporarily allow external traffic to pass through to ensure connection of devices within ring network 100.

In addition to loops forming within ring network 100, loops may also form when, for example, multiple uplinks 114, 124, and 134 between external network 199 and ring network 100 are active at the same time. This may occur when a packet is broadcast out to external network 199 via a first uplink (e.g., uplink 114), and then broadcast back to the ring network 100 via a different uplink (e.g., uplink 124), and so forth. Consequently, it may be desirable to prevent more than one uplink between ring network 100 and external network 199 from being simultaneously active. As with ring network ownership, some systems may have the active uplink configured by a network administrator. However, in the event of a failure, there may not be a system in place to automatically switch between uplinks 114, 124, and 134, requiring an administrator to manually reselect the active uplink between ring network 100 and external network 199. This may require an administrator to be regularly available or could otherwise lead to noticeable downtime of ring network 100. Further, there may be many points of failure that could cause an uplink to become disconnected from ring network 100. For example, if uplink 124 is the active uplink, either end of uplink 124 could become disconnected, switch 122 could fail, enclosure 120 could fail, and so forth. Time spent diagnosing these various points of failure may lead to further downtime.

Alternatively, the ring network administrator may be able to avoid loops if the owner of external network 199 is willing to run the spanning tree protocol over external network 199 to prevent messages going out on one uplink from returning to ring network 100 down another. However, relying on external network 199 may not be a viable solution because if external network 199 refuses or an error occurs, a loop may form potentially overloading ring network 100 with traffic. Because multiple external networks 199 associated with multiple customers may be affected by ring network 100 going down if one external network 199 causes a loop to be formed, it may be desirable to ensure that ring network 100 is capable of preventing loops due to multiple connections to external networks 199 on its own.

Consequently, management daemon 140 may also manage uplinks 114, 124, and 134 between ring network 100 and external network 199. When enclosures 110, 120, and 130 begin coming online, enclosures 110, 120, and 130 may be running their own internal daemons (not shown) that detect whether their respective enclosures have active operable connections (e.g., uplinks) to external network 199. Once detected, these operable connections may be isolated from ring network 100 so that traffic does not begin flowing into ring network 100 from external network 199. In various examples, the operable connections may be isolated by the internal daemons creating private VLANs within each corresponding enclosure that prevents packets from being transmitted from the operable connections out to the rest of ring network 100. Though it may be possible to fully deactivate the operable connections, isolating the operable connections in the manner described may facilitate periodically checking to see if the operable connections are still functioning in the event that an operable connection needs to be activated.

Additionally, after detecting active operable connections between enclosures 110, 120, and 130 and external network 199, corresponding internal daemons may begin periodically broadcasting statuses of the operable connections around ring network 100. These statuses may be broadcast using the ring network's private VLAN with the goal of informing management daemon 140 of the statuses of the operable connections. Once management daemon 140 begins receiving these status signals, management daemon 140 may select one of the operable connections to serve as the active uplink between ring network 100 and external network 199.

Various techniques may be used for selecting the active uplink. In some examples, management daemon 140 may know in advance attributes (e.g., latency, bandwidth) of uplinks 114, 124, and 134 between ring network 100 and external network 199. In an example where uplinks 114, 124, and 134 have similar or identical attributes, management daemon 140 may select active uplinks on a first come first selected basis by maintaining a table of active operable connections. Operable connections may be removed from the list if the operable connections go down. Alternatively, if management daemon 140 knows that some uplinks 114, 124, and 134 are preferred due to, for example, higher bandwidth, lower latency, a service level agreement, and so forth between ring network 100 and external network 199, management daemon 140 may prefer some operable connections over others when selecting active uplinks assuming more than one are active. Management daemon 140 may then periodically transmit an identifier of the active uplink around the ring so that enclosures 110, 120, and 130 know which uplink 114, 124, or 134 is being used. Additionally, the enclosure associated with the active uplink may receive this signal as an instruction to activate the uplink between ring network 100 and external network 199 allowing transmission of data between the two networks. This may cause the enclosure associated with the active uplink to remove the active uplink from the private VLAN used to isolate the active uplink, and begin transmitting packets between ring network 100 and external network 199

As ring network 100 has several potential uplinks 114, 124, and 134 to external network 199, it may be desirable to be able to switch to a different operable connection if the active uplink fails. In one example, an enclosure associated with the active uplink may remain operational despite disconnection of the active uplink. This may occur when, for example, there is a problem with the physical connection between that enclosure and external network 199. In this scenario, that enclosure may notify management daemon 140 of the disconnection. This may cause management daemon 140 to select a new active uplink and begin broadcasting an identifier of the new active uplink throughout ring network 100. The enclosure associated with the new active uplink may then remove that operable connection from the private VLAN to facilitate communication between external network 199 and ring network 100. When the older active uplink comes back up, that enclosure may notify management daemon 140 that the uplink has come online, and then place that uplink into a private VLAN until external network 199 again identifies that uplink as the active uplink between external network 199 and ring network 100.

In another example, connection to the entire enclosure may be lost. In some scenarios, the enclosure may still be operating and some other event may have caused connection to the enclosure to be lost. For example, if the internal daemon has ceased functioning, the entire enclosure may be operating and transmitting, including the active uplink, but management daemon 140 may realize it has not received a status signal regarding the active uplink in some time. In this case, management daemon 140 may transmit a signal to cause the enclosure associated with the active uplink to reboot. Forcing the reboot of the enclosure associated with the active uplink may ensure that the active uplink is taken down before management daemon 140 selects a new active uplink. In some examples, a neighboring enclosure of the enclosure associated with the active uplink may ultimately force the reboot of the enclosure associated with the active uplink. Once management daemon 140 is certain the active uplink is no longer connected, a new active uplink may again be selected, and its identifier may be broadcast throughout ring network 100.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
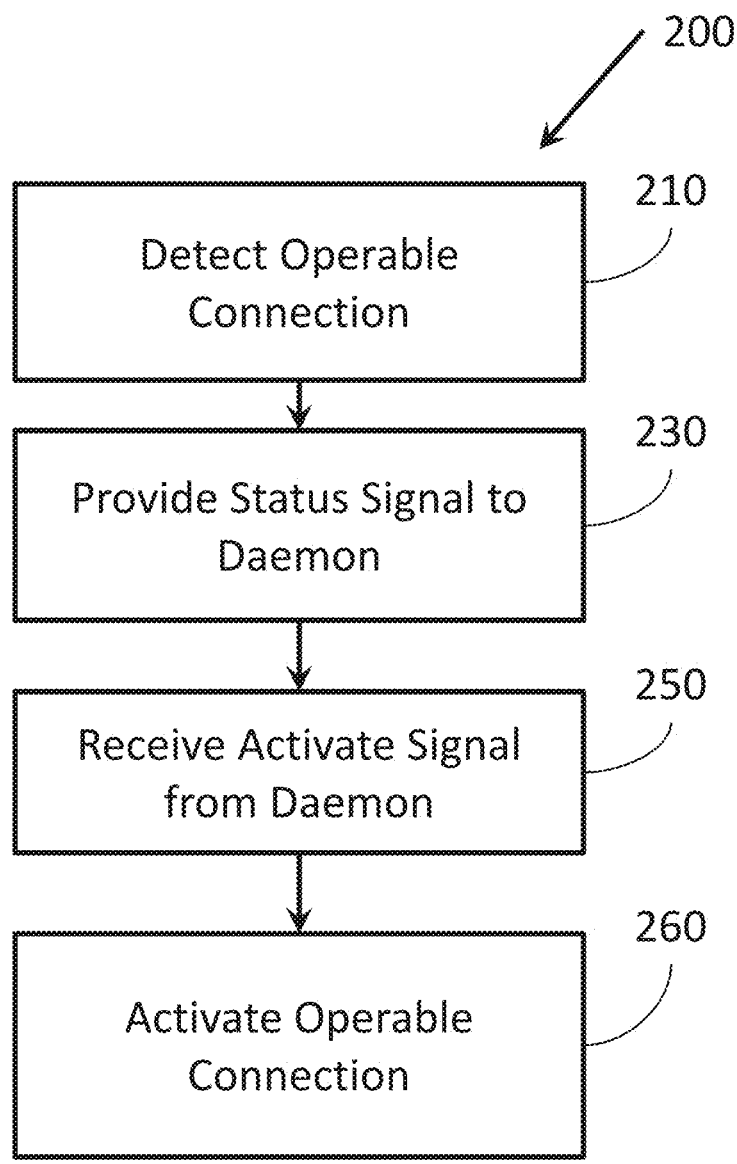
FIG. 2 illustrates a flowchart of example operations associated with ring network uplink designation.

FIG. 2 illustrates an example method 200 associated with ring network uplink designation. Method 200 may be embodied on a non-transitory computer-readable medium storing computer-executable instructions. The instructions, when executed by a computer, may cause the computer to perform method 200. In other examples, method 200 may exist within logic gates and/or RAM of an application specific integrated circuit (ASIC).

Method 200 includes detecting an operable connection at 210. The operable connection may be detected by a member of a ring network. The member of the ring network may detect the connection between an external network and the member of the ring network.

Method 200 also includes providing a status signal to a ring network management daemon at 230. The status signal may indicate that the member of the ring network has the operable connection the external network. The ring network management daemon may control various functions of the ring network. For example, the ring network management daemon may be the owner of the ring network. As described above, an owner of a ring network is a member of the ring network selected to prevent a loop of broadcast signals from forming in the ring network, and to perform various control functions in the ring network. In some examples, members of the ring network may communicate using a G.8032 protocol. Consequently, the ring network management daemon may control functions of the ring network using the G.8032 protocol. The signal provided to the ring network management daemon may be provided via a first broadcast signal. In various examples, the first broadcast signal may be transmitted using a virtual local area network (VLAN) over VLAN port 4095.

Method 200 also includes receiving an activate signal from the ring network management daemon at 250. The activate signal received from the ring network management daemon may designate the member of the ring network as an active uplink to the external network. As with the status signal, the activate signal may be received from the ring network management daemon via a second broadcast signal. The second broadcast signal may be transmitted using a virtual local area network over VLAN port 4095.

Method 200 also includes activating the operable connection between the ring network and the external network at 260. Activating the operable connection may facilitate communication between members of the ring network and the external network.

Figure 3:
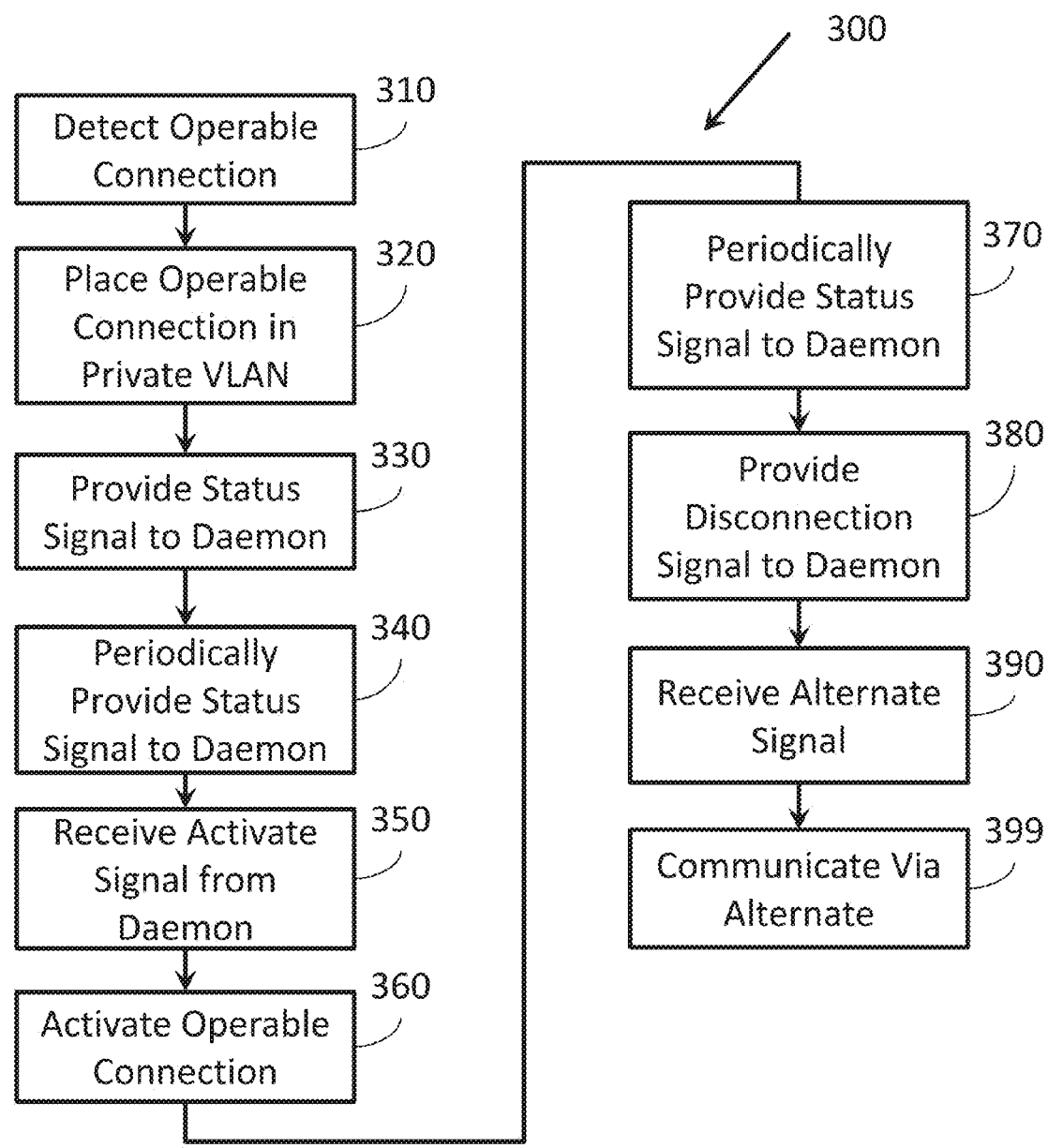
FIG. 3 illustrates another flowchart of example operations associated with ring network uplink designation.

FIG. 3 illustrates a method 300 associated with ring network uplink designation. FIG. 3 includes many actions similar to those described above with reference to method 200 (FIG. 2 above). For example, method 300 includes detecting an operable connection at 310, providing a status signal to the ring network management daemon at 330, receiving an activate signal from the ring network management daemon at 350, and activating the operable connection at 360.

Method 300 also includes placing the operable connection in a private VLAN at 320. Placing the operable connection into the private VLAN may facilitate periodic determination of a connection status of the operable connection. Method 300 also includes periodically providing a status signal to the ring network management daemon at 340. The status signal may indicate the connection status of the operable connection. Periodically providing the status signal may allow the management daemon to track the status of the operable connection. This may ensure that the management daemon knows whether the operable connection is active if the management daemon needs to select the operable connection to become the active uplink.

Method 300 also includes periodically providing a status signal to the ring network management daemon at 370. As above, the status signal may indicate the member of the ring network has an operable connection to the external network. Here, periodically providing the status signal may facilitate ensuring the management daemon knows that the enclosure associated with the active uplink and that the active uplink are operational. If the management daemon loses contact with the enclosure associated with the active uplink for a predetermined period, the management daemon may take steps to activate a new uplink between the ring network and the external network.

Method 300 also includes providing a disconnection signal to the ring network management daemon at 380. The disconnection signal may indicate when the operable connection has become disconnected. When the management daemon receives the disconnection signal indicating the operable connection has failed for whatever reason, the management daemon may take steps to activate a new uplink between the ring network and the external network.

Method 300 also includes receiving an alternate signal from the ring network management daemon at 390. The alternate signal may designate an alternate member of the ring network as the active uplink. Method 300 also includes communicating to the external network via the alternate member of the ring network at 399.

Figure 4:
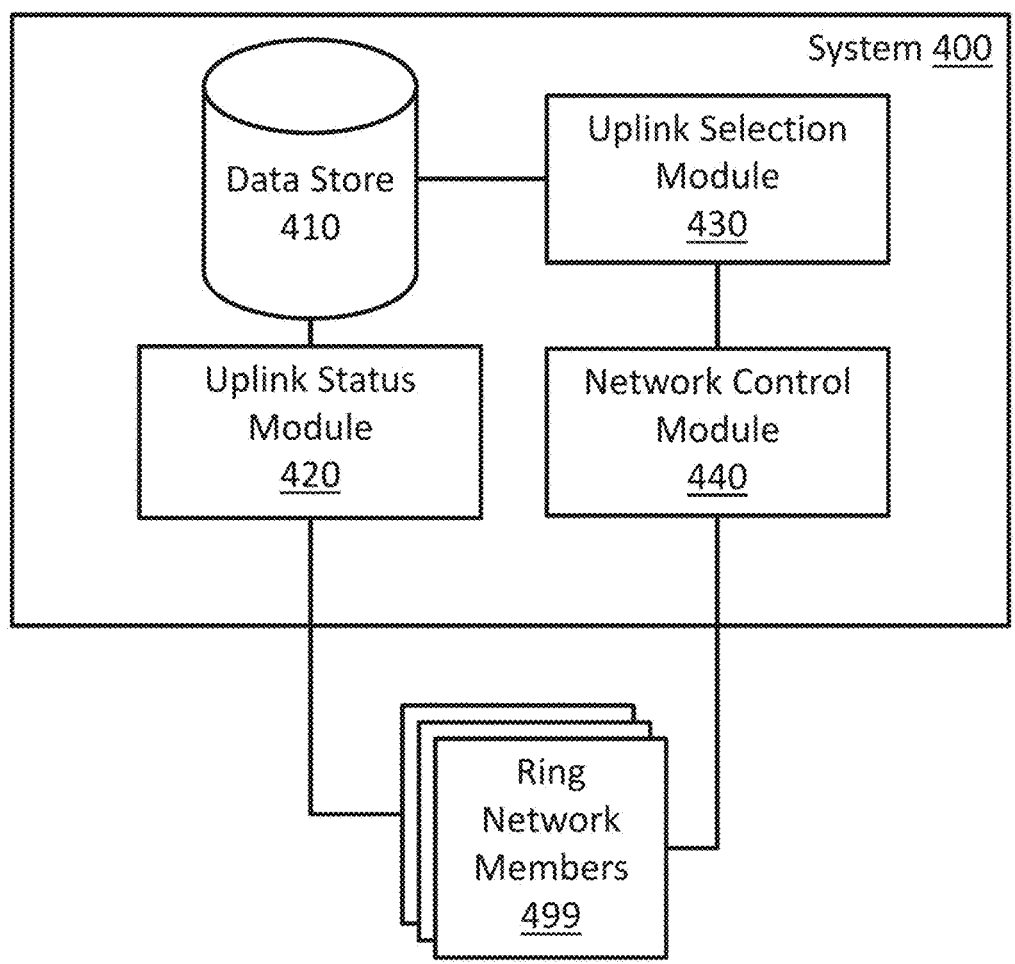
FIG. 4 illustrates an example system associated with ring network uplink designation.

FIG. 4 illustrates a system 400. System 400 includes a data store 410. Data store 410 may store data describing operable connections between an external network and members of a ring network 499. In various examples, the data store may be a table that describes the operable connections. The table may include, for example, addresses associated with the operable connection (e.g., address associated with the enclosure housing the operable connection), addresses associated with neighbors of the operable connection, state information of the operable connection, attributes (e.g., bandwidth, latency to the external network) of the operable connection, and so forth.

System 400 also includes an uplink status module 420. Uplink status module 420 may update the data describing operable connections in data store 410. The data describing operable connections may be updated based on statuses of respective operable connections contained in signals received from the members of the ring network 499. In one example, data store 410 may contain references to active operable connections and ordered based on how long the operable connections have been active. In this example, when uplink status module 420 receives a signal identifying a new operable connection, the operable connection may be added to the end of the table. If an operable connection goes down, uplink status module 420 may remove the entry for that operable connection from data store 410.

System 400 also includes an uplink selection module 430. Uplink selection module 430 may designate which operable connection will serve as an active uplink between the ring network and the external network. Uplink selection module 430 may designate the active uplink based on statuses of the operable connections. As described above, uplink selection module 430 may designate active uplinks based on time online, attributes of operable connections (e.g., bandwidth, latency), or on other factors.

System 400 also includes a network control module 440. Network control module 440 may periodically broadcast an identifier of the active uplink to the members of the ring network 499. The identifier of the active uplink may cause a member of the ring network 499 associated with the active uplink to activate its corresponding operable connection to the external network. Additionally, the identifier of the active uplink may cause members of the ring network 499 to transmit data between the external network and the ring network via the member of the ring network associated with the active uplink.

When uplinks status module 420 has not received a signal from the member of the ring network associated with the active uplink for a specified period of time, uplink status module 420 may begin to assume that the member of the ring network associated with the active uplink has gone down, failed, or become otherwise non-communicative. In this case, network control module 440 may transmit a deactivation signal that causes the member of the ring network associated with the active uplink to deactivate the active uplink. In one example, the deactivation signal may be sent to a neighbor of the member of the ring network associated with the active uplink. The deactivation signal may cause the neighbor to reset the member of the ring network associated with the active uplink.

In various scenarios, the network control module may need to transmit a signal indicating that an active uplink needs to be replaced with a replacement uplink to cause members of the ring network 499 to stop transmitting to the external network via the active uplink, and begin transmitting to the external network via the replacement uplink. These scenarios may include, for example, the above scenario where the uplink status module has not received an signal from an member of the ring network associated with the active uplink for some time, a scenario where the member of the ring network associated with the active uplink provides a signal to uplink status module 420 indicating the active uplink has gone down, some other manner of detecting that the operable connection associated with the active uplink has become disconnected, and so forth. To facilitate smooth transitioning to the replacement uplink, network control module 440 may transmit a flush command to members of the ring network. The flush command may be transmitted prior to transmitting an identifier of the replacement uplink.

Figure 5:
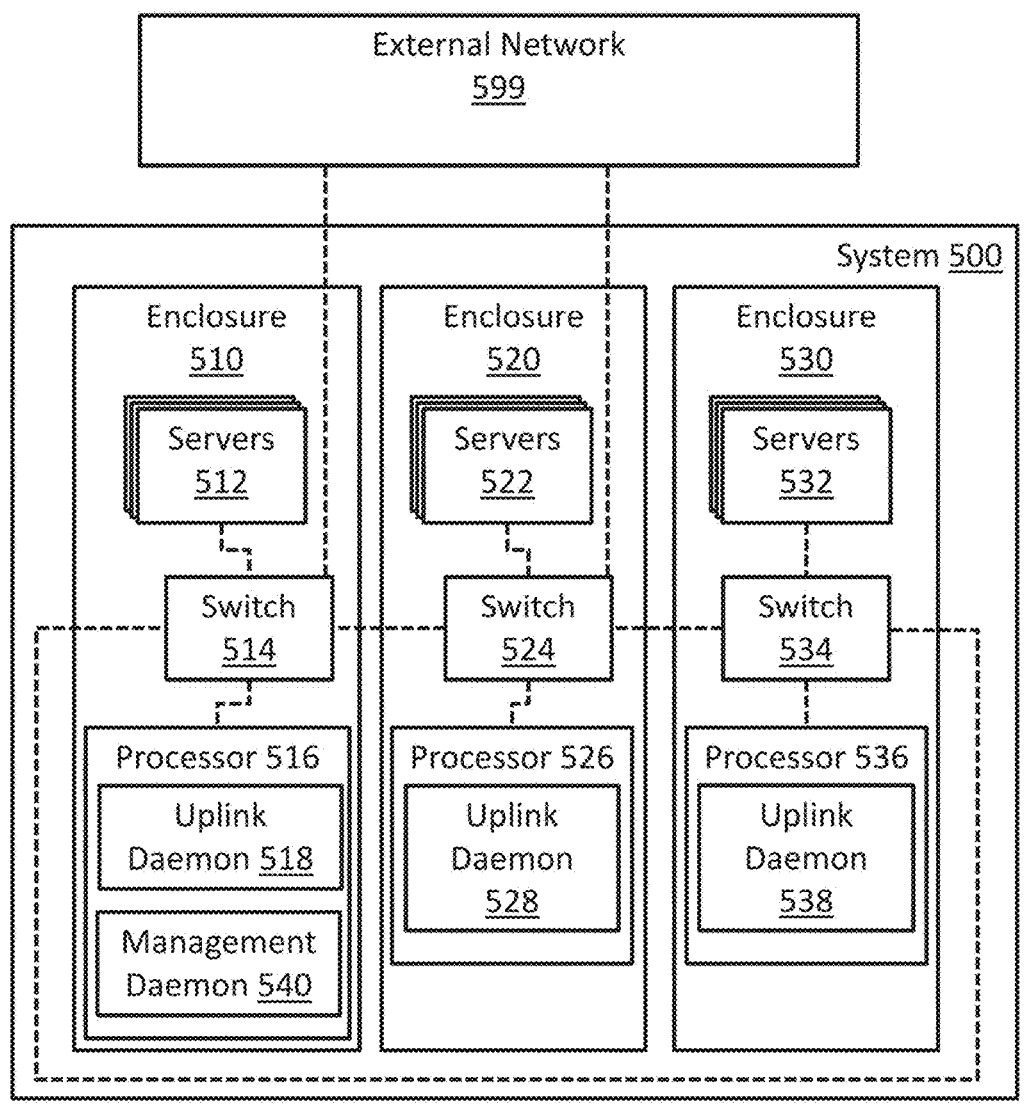
FIG. 5 illustrates another example system associated with ring network uplink designation.

FIG. 5 illustrates a system 500 associated with ring network uplink designation. System 500 includes a set of enclosures 510, 520, and 530. The set of enclosures may be organized as a ring network. Though three enclosures are shown, system 500 may include more or fewer enclosures.

Each enclosure 510, 520, and 530 includes a set of servers 512, 522, and 532. These servers 512, 522, and 532 may perform services for an external network 599. The external network may be a private network, a public network (e.g., the Internet), and so forth. The services may include, for example, application services, database services, other storage services, cloud services, processing services, and so forth.

Each enclosure 510, 520, and 530 includes a respective network switch 514, 524, and 534. The network switches 514, 524, and 534 may transmit traffic between the enclosures 510, 520, and 530, the servers 514, 524, and 534. When an enclosure has a respective operable connection to external network 599, the network switches 514, 524, and 534, may also transmit traffic to and from external network 599. In this example, enclosures 510 and 520 have operable connections to external network 599.

Each enclosure may also include a processor 516, 526, and 536. In various examples, processors 516, 526, and 536 may perform various functions associated with management and operation of the ring network, whereas servers 512, 522, and 532 perform the services requested by members of the external network 599. Each processor 516, 526, and 536 may operate a corresponding uplink daemon 518, 528, and 538. The uplink daemons 518, 528, and 538 may detect whether the corresponding enclosure 510, 520, and 530, has the respective operable connection to external network 599. The uplink daemons 518, 528, and 538 may also broadcast statuses of respective operable connections to other enclosures 510, 520, and 530. Uplink daemons 518, 528, and 538 may also selectively isolate respective operable connections from other enclosures, 510, 520, and 530 until receiving an instruction identifying their respective operable connections as an active uplink between the enclosures and external network 599.

System 500 also includes a management daemon 540. Management daemon 540 may be operating on a processor 516, 526, or 536 of an enclosure 510, 520, and 530. In this example, management daemon 540 is operating on processor 516 of enclosure 510. Management daemon 540 may maintain a list of enclosures 510, 520, and 530 having operable connections to external network 599. The list of enclosures may be maintained based on statuses received from uplink daemons 518, 528, and 538. Management daemon 540 may also designate an operable connection as the active uplink between the ring network and external network 599. Management daemon 540 may also broadcast the instruction identifying the operable connection as the active uplink, causing the corresponding uplink daemon 518, 528, or 538, to activate its operable connection, allowing members of the ring network to communicate with external network 599. In one example, when designating the operable connection as the active uplink, management daemon 540 may select an enclosure 510, 520, or 530 with an oldest active operable connection from the list of enclosures.

As mentioned above, management daemon 540 may operate on an enclosure designated the G.8032 owner of the ring network. In various examples, management daemon 140 may be a code segment incorporated into uplink daemon code. When an uplink daemon detects its enclosure is the ring owner, code associated with management daemon 140 may activate. Similarly, if ring ownership changes from a first enclosure to a second enclosure, code associated with management daemon 140 may deactivate on the first enclosure and activate on the second enclosure.

Figure 6:
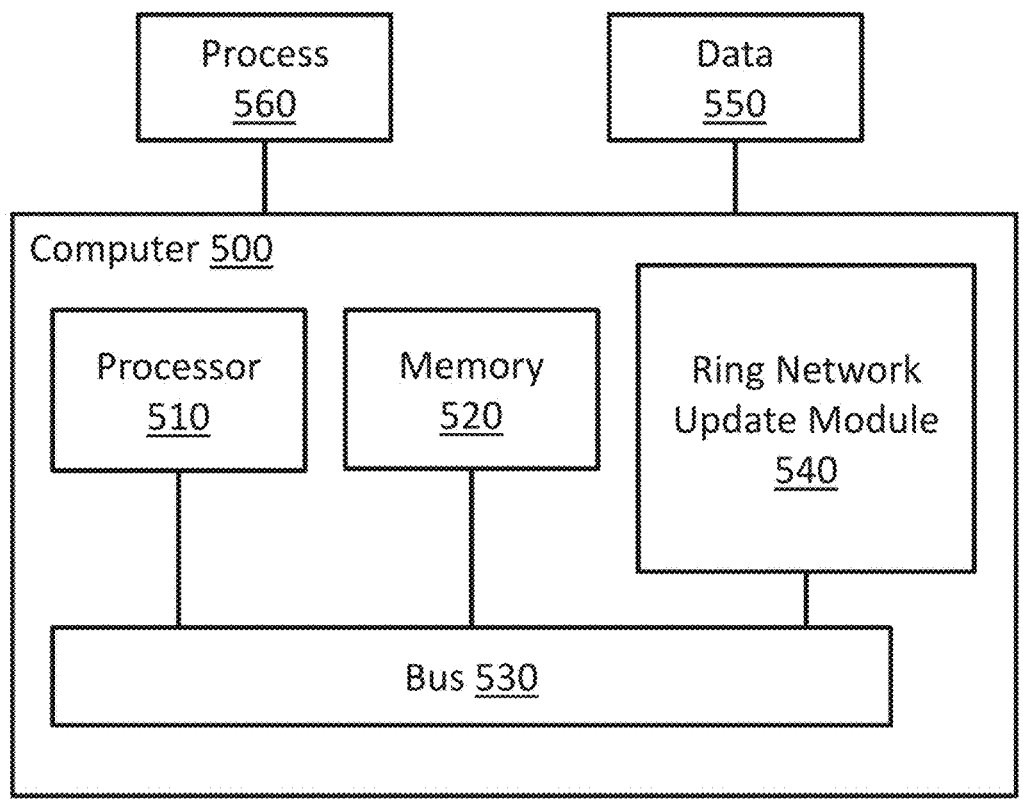
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. The computer 600 includes a ring network uplink designation module 640. Ring network uplink designation module 640 may perform, alone or in combination, various functions described above with reference to the example systems, methods, apparatuses, and so forth. In different examples, ring network uplink designation module 640 may be implemented as a non-transitory computer-readable medium storing computer-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of various processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
    detecting, by a member of a ring network, an operable connection between the member of the ring network and an external network;
    providing a status signal to a ring network management daemon indicating the member of the ring network has the operable connection to the external network;
    receiving an activate signal from the ring network management daemon designating the member of the ring network as an active uplink to the external network; and
    activating the operable connection between the ring network and the external network to facilitate communication between members of the ring network and the external network.

2. The method of claim 1, comprising periodically providing a status signal to the ring network management daemon indicating the member of the ring network has an operable connection to the external network.

3. The method of claim 1, where the ring network management daemon controls a function of the ring network using a G.8032 protocol.

4. The method of claim 1, where the status signal provided to the ring network management daemon is provided via a first broadcast signal, and where the activate signal from the ring network management daemon is received via a second broadcast signal.

5. The method of claim 4, where the first broadcast signal and the second broadcast signals are transmitted using a virtual local area network (VLAN) over VLAN port 4095.

6. The method of claim 1, comprising:
    providing a disconnection signal to the ring network management daemon indicating disconnection of the operable connection;
    receiving an alternate signal from the ring network management daemon designating an alternate member of the ring network as the active uplink; and
    communicating to the external network via the alternate member of the ring network.

7. The method of claim 1, comprising:
    placing the operable connection into a private VLAN to facilitate periodic determination of a connection status of the operable connection; and
    periodically providing a status signal to the ring network management daemon indicating the connection status of the operable connection.

8. The method of claim 1, where the ring network management daemon is the owner of the ring network.

9. A system, comprising:
    a data store to store data describing operable connections between an external network and members of a ring network;
    an uplink status module to update the data describing operable connections based on statuses of respective operable connections contained in signals received from the members of the ring network;
    an uplink selection module to designate which operable connection will serve as an active uplink between the ring network and the external network based on statuses of the operable connections; and a network control module to periodically broadcast an identifier of the active uplink to members of the ring network.

10. The system of claim 9, where the identifier of the active uplink causes a member of the ring network associated with the active uplink to activate its operable connection with the external network, and where the identifier of the active uplink causes members of the ring network to transmit data between the external network and the ring network via the member of the ring network associated with the active uplink.

11. The system of claim 9, where the network control module transmits a deactivation signal that causes a member of the ring network associated with the active uplink to deactivate the active uplink when the uplink status module has not received a signal from the member of the ring network associated with the active uplink for a specified period of time.

12. The system of claim 11, where the deactivation signal is sent to a neighbor of the member of the ring network associated with the active uplink, and where the deactivation signal causes the neighbor to reset the member of the ring network associated with the active uplink.

13. The system of claim 9, where the network control module transmits a flush command to members of the ring network prior to transmitting an identifier of a replacement uplink after detecting that an operable connection associated with the active uplink has become disconnected.

14. A system, comprising:
a set of enclosures organized as a ring network, where each enclosure comprises:
a set of servers that perform services for an external network; and
a network switch to transmit traffic between the servers, other enclosures, and the external network; and
a processor running an uplink daemon, the uplink daemon to detect whether the enclosure has a respective operable connection to the external network, to broadcast status of the respective operable connection to other enclosures, and to selectively isolate the respective operable connection from other enclosures until receiving an instruction identifying the operable connection as an active uplink between the ring network and the external network; and
a management daemon operating on a processor of an enclosure to maintain a list of enclosures with operable connections to the external network based on statuses received from uplink daemons, to designate an operable connection as the active uplink, and to broadcast the instruction identifying the operable connection as the active uplink.

15. The system of claim 14, where the management daemon, when designating the operable connection as the active uplink, selects an enclosure with the oldest active operable connection from the list of enclosures.

\* \* \* \* \*